No. 679,298. Patented July 30, 1901.
J. T. COLE.
FERTILIZER DISTRIBUTER.
(Application filed May 18, 1901.)
(No Model.)
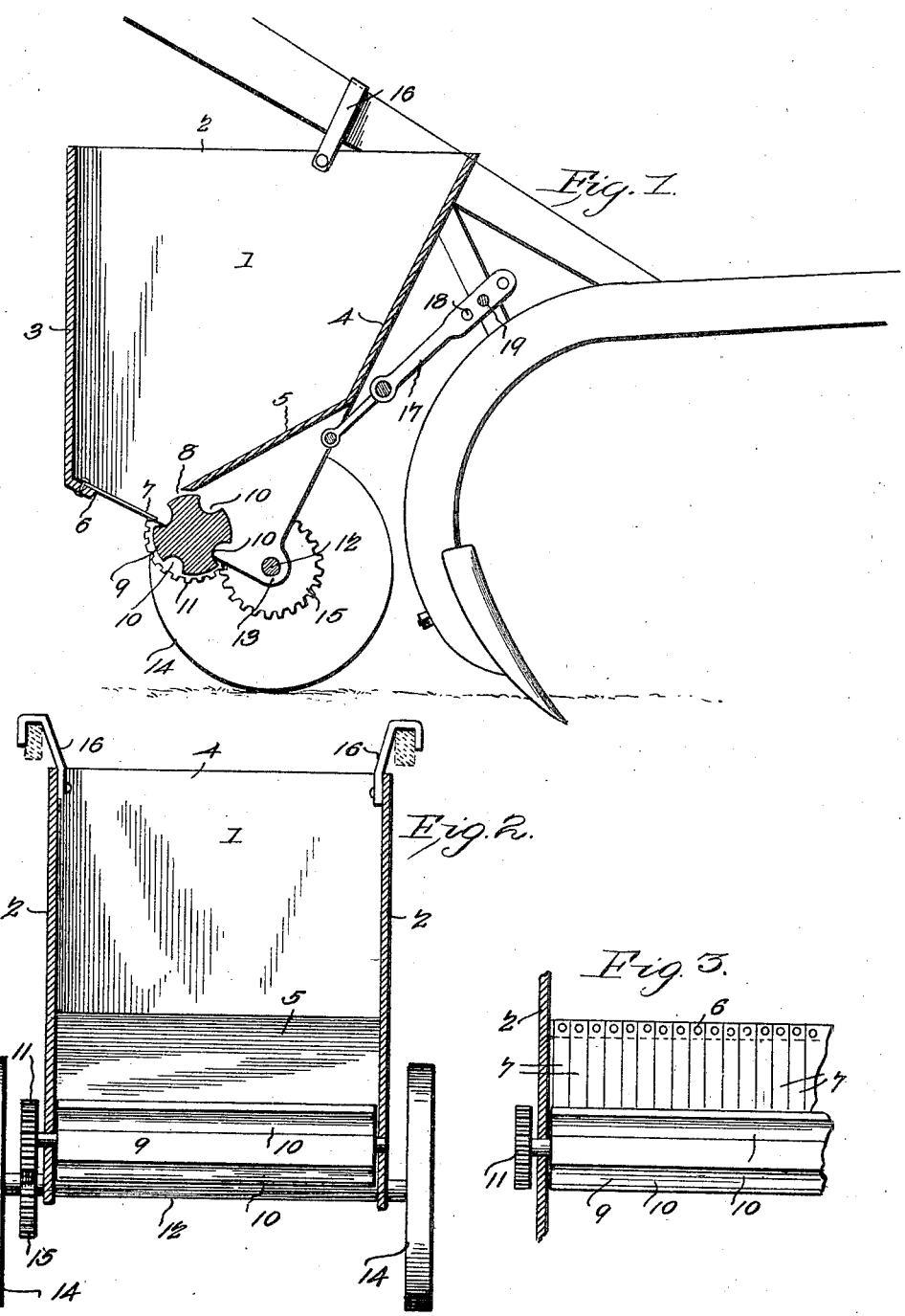
Witnesses
O. M. Simpson
J. W. Garner
John T. Cole Inventor
by C. A. Snow & Co.
Attorneys

UNITED STATES PATENT OFFICE.

JOHN T. COLE, OF MALMAISON, VIRGINIA.

FERTILIZER-DISTRIBUTER.

SPECIFICATION forming part of Letters Patent No. 679,298, dated July 30, 1901.

Application filed May 18, 1901. Serial No. 60,928. (No model.)

*To all whom it may concern:*

Be it known that I, JOHN T. COLE, a citizen of the United States, residing at Malmaison, in the county of Pittsylvania and State of Virginia, have invented a new and useful Fertilizer-Distributer, of which the following is a specification.

My invention is an improved fertilizer-distributer adapted for use in connection with a single-shovel plow, whereby a furrow may be opened for planting and fertilizer distributed therein at a single operation; and my invention consists in the peculiar construction and combination of devices hereinafter fully set forth and claimed.

In the accompanying drawings, Figure 1 is a sectional view of a fertilizer-distributer constructed in accordance with my invention, showing the same attached in operative position to a single-shovel plow of usual form. Fig. 2 is a sectional view of my improved fertilizer-distributer, taken on a plane at right angles to that of Fig. 1. Fig. 3 is a detail top plan view of a portion of the revoluble toothed roller and the coacting notched bottom-board of the hopper.

In the embodiment of my invention I provide a hopper 1, which is adapted to be disposed between the handles of a single-shovel plow and in rear of the standard thereof. The sides 2 of the hopper and the rear side 3 thereof are vertical. The front side 4 of the hopper is inclined, as shown, and a downwardly and rearwardly inclined board 5 partially forms the bottom of the hopper. A forwardly downwardly inclined bottom-board 6 connects the side walls 2 and extends forward from the lower side of the rear wall 3. The lower front edge of the board 6 is provided with a series of spring-slats 7, which extend from one side of the hopper to the other, and an opening 8 is formed transversely in the bottom of the hopper between the inclined bottom-boards 5 6, the rear edge of the board 5 being disposed above the front edge of the board 6, as shown in Fig. 1.

A revoluble distributing-roller 9 is journaled in bearings in the side walls 2 of the hopper, said roller being disposed under the rear side of the inclined bottom-board 5 and in advance of the bottom-board 6 and in proximity to the said boards. The said distributing-roller is disposed opposite the opening 8 and is provided with a series of longitudinal peripheral grooves 10, which as the roller rotates pass rearwardly and downwardly past the front ends of the spring-slats 7, which cut off the discharge of material from the hopper, excepting such material as fills the grooves successively as the roller rotates. At one end of the shaft of roller 9 on the outer side of the hopper is a spur gear-wheel 11. An axle-shaft 12 is journaled in bearings 13 in the sides of the hopper, at the lower side thereof. On the said axle-shaft are traction-wheels 14, which by contact with the ground are adapted to rotate the said axle-shaft, and the latter is further provided with a spur gear-wheel 15, which meshes with the gear 11. Hooks 16 are attached to the sides of the hopper, at the top thereof, and are adapted to engage the handles of the plow, as shown, and thereby suspend the hopper between the handles. A link-bar 17 is attached to the front portion of the hopper and is provided at its front end with a series of adjusting-openings 18. A rod 19 passes through one of these openings and through openings in the handle-braces, as shown, and thereby secures the said link-bar to the handle-braces. By this means the fertilizer-distributer is attached to the plow, so that when the latter is in operation the fertilizer-distributer travels in rear thereof. The rotary motion of the axle-shaft 12 is communicated through the gears hereinbefore described to the distributing-roller, and the motion of the latter and the grooves thereof, in coaction with the spring-slats 7, forming a portion of the bottom of the hopper, serve to distribute the fertilizer placed in the hopper evenly in the furrows. Hence the fertilizer is distributed in the furrow as the latter is opened.

My improved fertilizer-distributer is exceedingly simple in construction, is strong and durable, may be readily attached to and detached from a single-shovel plow of ordinary construction, and used in connection therewith is entirely efficient in distributing fertilizer in the furrows as the same are opened.

Having described my invention, I claim—

1. In a fertilizer-distributer, a hopper having an inclined bottom-board 5, oppositely-inclined spring-slats forming part of the bottom of the hopper, a discharge-opening 8 being formed between said slats and said bottom-board, a distributing-roller disposed with one side opposite said discharge-opening, said roller having longitudinal peripheral grooves to receive and convey material from said hopper, said spring-slats forming cut-offs and bearing against said roller, and means to rotate said distributing-roller, substantially as described.

2. In a fertilizer-distributer, a hopper having an inclined bottom-board 5, oppositely-inclined spring-slats forming part of the bottom of the hopper, a discharge-opening 8 being formed between said slats and said bottom-board, a distributing-roller disposed with one side opposite said discharge-opening, said roller having longitudinal peripheral grooves to receive and convey material from said hopper, said spring-slats forming cut-offs and bearing against said roller, an axle-shaft having its bearings in said hopper, ground-wheels on said axle-shaft, and gears connecting said axle-shaft and said distributing-roller, whereby the latter is rotated, substantially as described.

In testimony that I claim the foregoing as my own I have hereto affixed my signature in the presence of two witnesses.

JOHN T. COLE.

Witnesses:
M. H. TREDWOY,
J. R. COOK.